US012597319B2

(12) United States Patent
Cohen et al.

(10) Patent No.: US 12,597,319 B2
(45) Date of Patent: Apr. 7, 2026

(54) GAMING DEVICE WITH PERSISTENCE CYCLING

(71) Applicant: Aristocrat Technologies, Inc., Las Vegas, NV (US)

(72) Inventors: Zachary Cohen, Chicago, IL (US); Nathan Warms, Austin, TX (US); Hanna Sanborn, Georgetown, TX (US); Jennifer Mizzi, Ewa Beach, HI (US); Erick Ching, Cedar Park, TX (US); Rogelio Decasa, Jr., Renton, WA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 272 days.

(21) Appl. No.: 18/460,448

(22) Filed: Sep. 1, 2023

(65) Prior Publication Data

US 2024/0105017 A1 Mar. 28, 2024

Related U.S. Application Data

(60) Provisional application No. 63/376,937, filed on Sep. 23, 2022.

(51) Int. Cl.
*G07F 17/32* (2006.01)

(52) U.S. Cl.
CPC ...... *G07F 17/3267* (2013.01); *G07F 17/3211* (2013.01); *G07F 17/3227* (2013.01)

(58) Field of Classification Search
None
See application file for complete search history.

(56) References Cited

U.S. PATENT DOCUMENTS

| | | | | |
|---|---|---|---|---|
| 7,713,119 | B2 * | 5/2010 | Pacey | G07F 17/32 463/16 |
| 8,313,367 | B2 | 11/2012 | Hamlin | |
| 8,998,705 | B2 | 4/2015 | Joshi | |
| 10,068,358 | B2 | 9/2018 | Kelly | |
| 10,068,435 | B2 | 9/2018 | Gugler | |
| 2015/0379822 | A1 | 12/2015 | Ellis | |
| 2022/0284761 | A1 | 9/2022 | Seckel | |
| 2023/0154287 | A1 * | 5/2023 | Bouvier | G07F 17/326 463/20 |
| 2025/0209889 | A1 * | 6/2025 | Bouvier | G07F 17/3211 |

* cited by examiner

*Primary Examiner* — Ronald Laneau
(74) *Attorney, Agent, or Firm* — Armstrong Teasdale LLP

(57) ABSTRACT

A gaming system includes a processor and a memory storing a plurality of stage game rule sets. Each rule set of the stage game rule sets corresponding with a stage of a game. The processor is programmed to cause display of columns each including symbol positions based on a first game configuration for a first instance of a first stage of the game and determine a first game outcome for the first instance based on the first game configuration and a first rule set. The processor is further programmed to change the first game configuration to a second game configuration based on a first trigger symbol occurring in the first game outcome and determine a second game outcome for a first game instance of a second stage of the game based on the second game configuration and a second rule set associated with the second stage.

20 Claims, 16 Drawing Sheets

GAMING DEVICE WITH PERSISTENCE CYCLING

CROSS REFERENCE TO RELATED APPLICATIONS

This application claims priority to U.S. Patent Application No. 63/376,937, filed Sep. 23, 2022, the entire contents of which are hereby incorporated by reference.

TECHNICAL FIELD

The field of disclosure relates generally to electronic gaming devices, systems and methods that provide a persistent cycling of game instances during game play.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a gaming system is provided. The gaming system includes a processor and a memory storing a plurality of stage game rule sets. Each rule set of the stage game rule sets corresponding with a stage of a game. The processor is programmed to cause display of columns each including symbol positions based on a first game configuration for a first instance of a first stage of the game and determine a first game outcome for the first instance based on the first game configuration and a first rule set. The processor is further programmed to change the first game configuration to a second game configuration based on a first trigger symbol occurring in the first game outcome and determine a second game outcome for a first game instance of a second stage of the game based on the second game configuration and a second rule set associated with the second stage.

In another aspect, a non-transitory computer-readable media containing instructions embodied thereon is provided. The instructions, when executed by a processor, cause the processor to store a plurality of stage game rule sets, each rule set of the stage game rule sets corresponding with a stage of a game and cause display of a plurality of columns each including a plurality of symbol positions based on a first game configuration for a first game instance of a first stage of the game. The instructions further cause the processor to determine a first game outcome for the first game instance based on the first game configuration and a first rule set associated with the first stage and change the first game configuration to a second game configuration based on a first trigger symbol occurring in the first game outcome, the first rule set identifying the first trigger symbol and the change to be made to the first game configuration. The instructions further cause the processor to determine a second game outcome for a first game instance of a second stage of the game based on the second game configuration and a second rule set associated with the second stage.

In yet another aspect, a method of implementing a game is provided. The method includes storing a plurality of stage game rule sets on a memory, each rule set of the stage game rule sets corresponding with a stage of the game and causing display of a plurality of columns each including a plurality of symbol positions based on a first game configuration for a first game instance of a first stage of the game. The method further includes determining a first game outcome for the first game instance based on the first game configuration and a first rule set associated with the first stage and changing the first game configuration to a second game configuration based on a first trigger symbol occurring in the first game outcome, the first rule set identifying the first trigger symbol and the change to be made to the first game configuration. The method further includes determining a second game outcome for a first game instance of a second stage of the game based on the second game configuration and a second rule set associated with the second stage.

DETAILED DESCRIPTION

Figure 1:
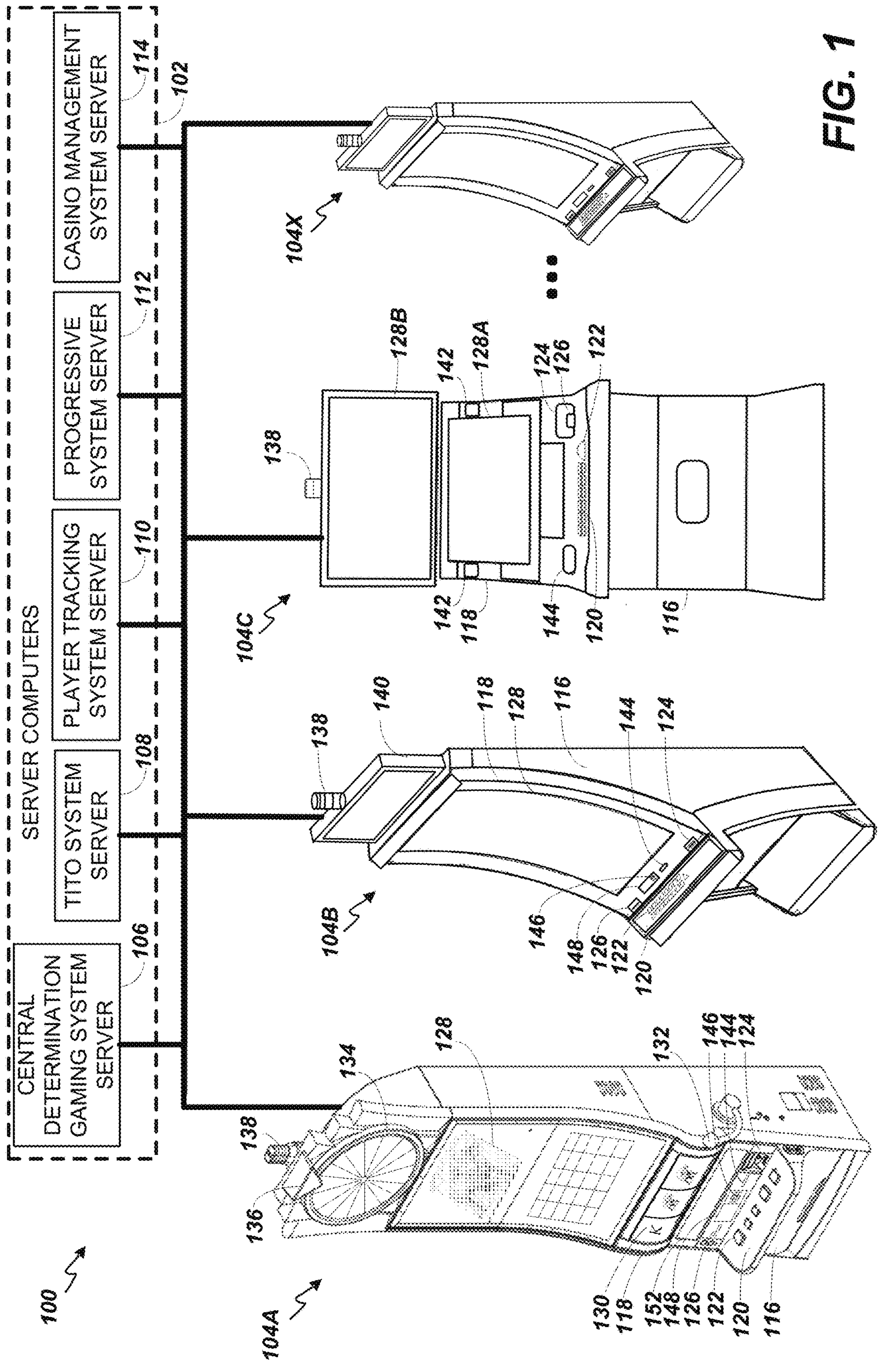
FIG. 1 is an exemplary diagram showing several gaming machines networked with various gaming related servers.

Described herein are systems and methods for providing persistence cycling in electronic gaming. An electronic game is provided including plurality of reels provided within a plurality of symbol positions. The game includes a plurality of stages that are each associated with distinct rule sets for conducting the game, wild symbols, triggering persistent symbols, etc. As a result, the rules change as a player advances through different game instances of the game. For example, the game may begin in a spring stage or season, cycling through the seasons and repeating a spring after every winter. Each of the seasons may have different game features that persist into different game instances, and/or across the different stages.

The technical problems addressed herein include: (i) inability of known systems to provide cycling game stages with distinct rules, such as different credit award rules or different matrix configurations; (ii) inability of known systems to provide cycling game stages that are based on a non-random occurrence, such as the playing by a player of a distinct number of game play instances; (iii) inability of known systems to maintain a controlled and/or consistent return to player (RTP) across different game stages, such that the game stages are unevenly favored or disfavored by the players; (iv) inability of known systems to persist game configuration changes, such as a change in a number of total symbol positions, between different game stages; (iv) inefficient use of computer resources in known gaming systems at least because of burdensome processing requirements when determining game configuration changes while maintaining a consistent RTP; and (vi) lack of processing availability and speed in known gaming systems at least because of the burdensome processing requirements.

The resulting technical effect and/or technical benefits achieved herein include at least one of: (i) ability to provide a game having cycling game stages, each with distinct rules; (ii) ability to provide cycling game stages that are based on a non-random occurrence, such as the playing by a player of a distinct number of game play instances; (iii) ability to maintain a controlled and/or consistent return to player (RTP) across the different game stages, such that the game stages are evenly favored or disfavored by the players; (iv) ability to persist game configuration changes, such as a change in a number of total symbol positions, between different game stages; (iv) improved efficiency in the use of computer resources by performing a lookup of distinct rule sets associated with a game stage to determine game configuration changes while maintaining a consistent RTP; and (vi) improved processing availability and speed at least because of the improved efficiency in the use of computer resources.

The description provided herein includes certain examples and exemplary use cases. It should be understood that these examples and use cases are included herein for illustrative purposes, and these examples and use cases should not be taken to limit the present disclosure. The systems and methods described herein may be used in many other use cases.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
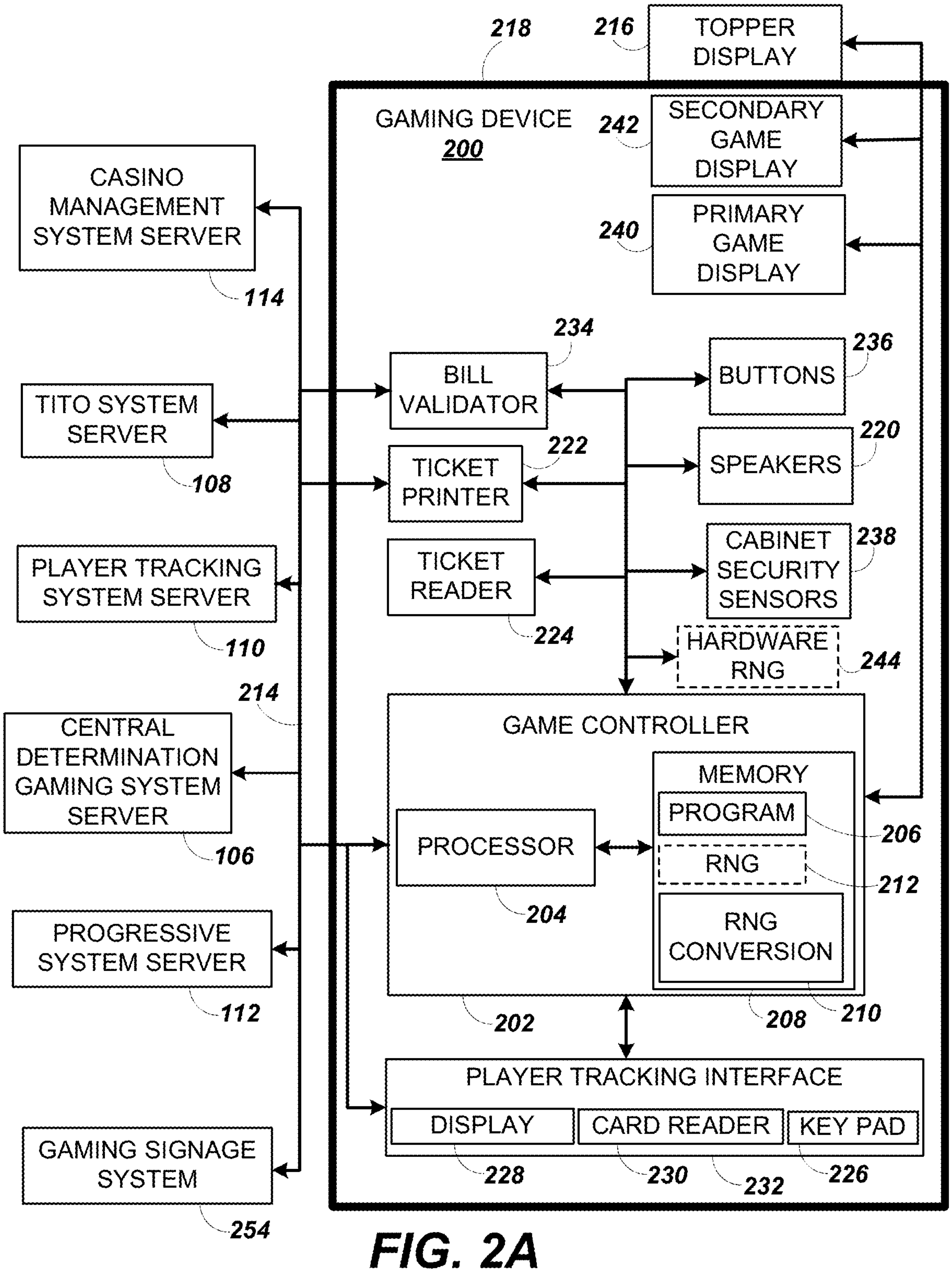
FIG. 2A is a block diagram showing various functional elements of an exemplary gaming machine.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
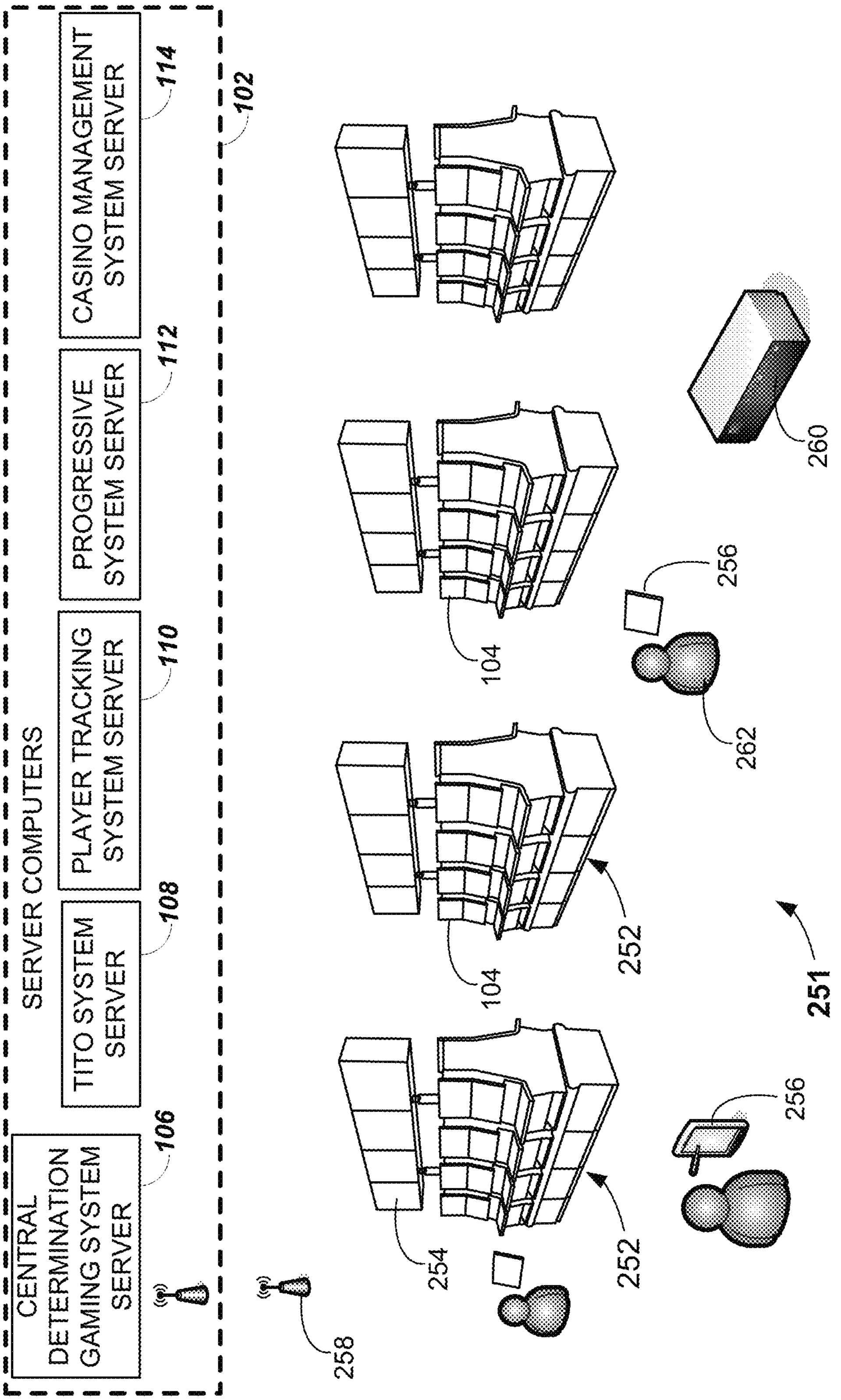
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
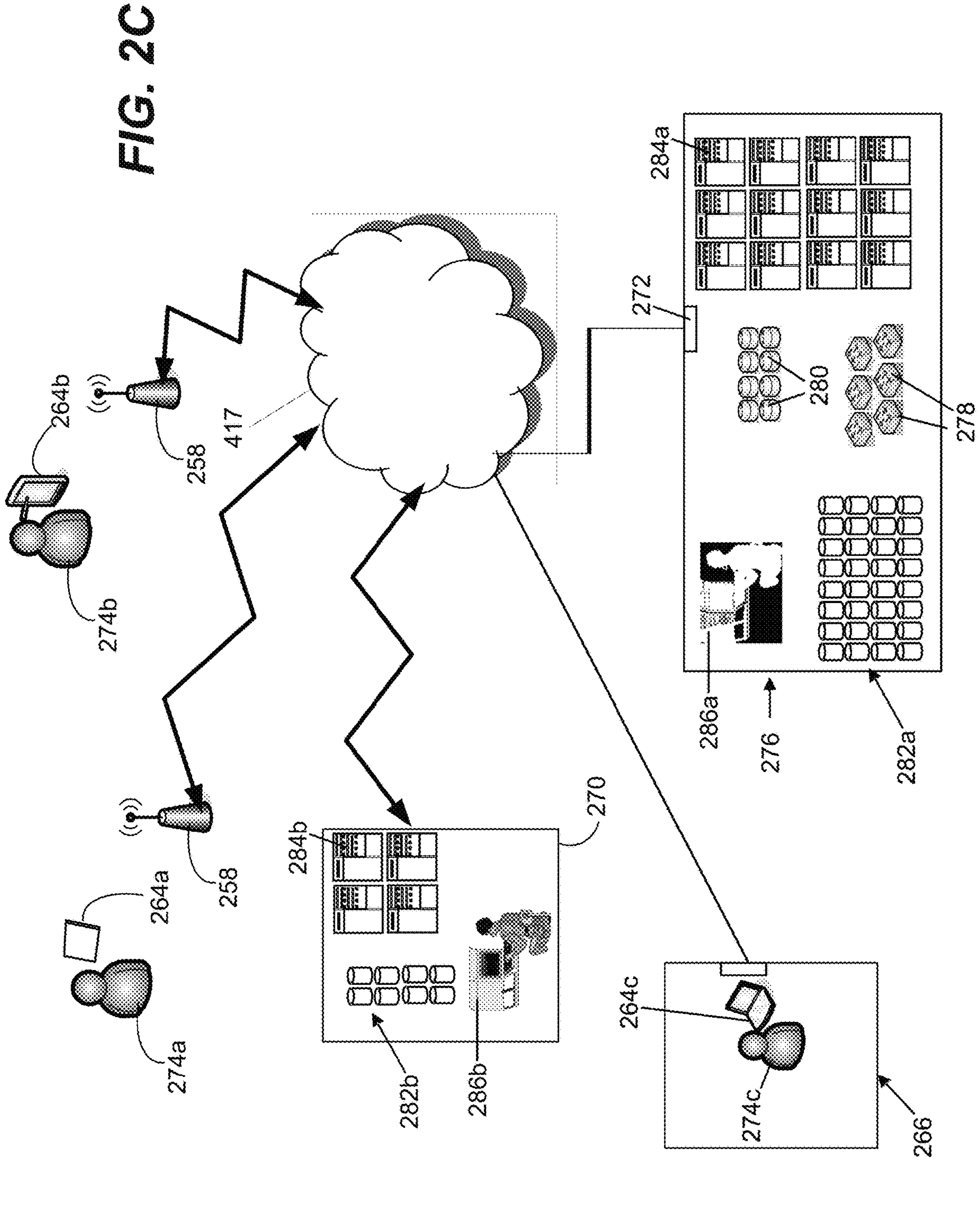
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*b*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
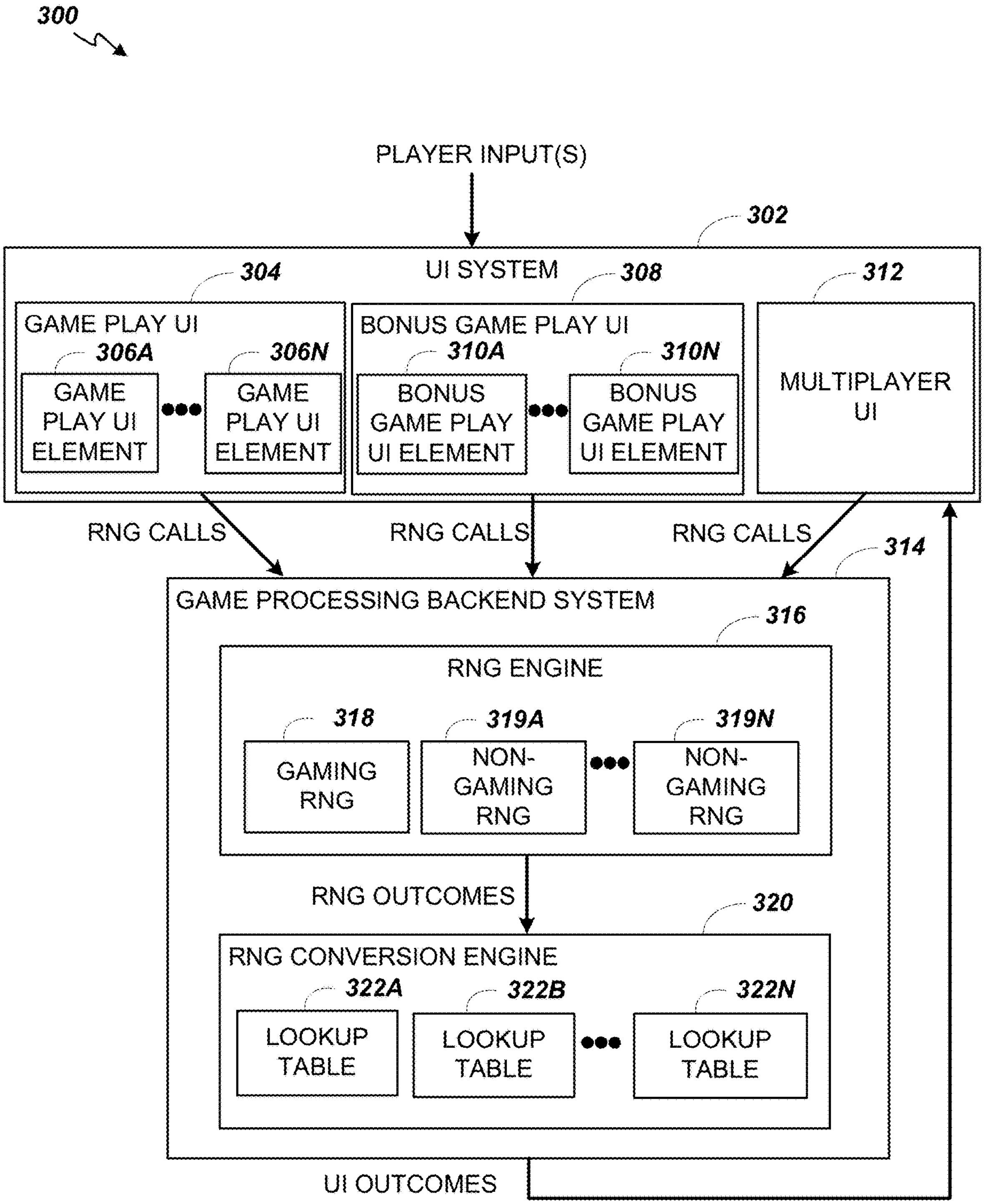
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
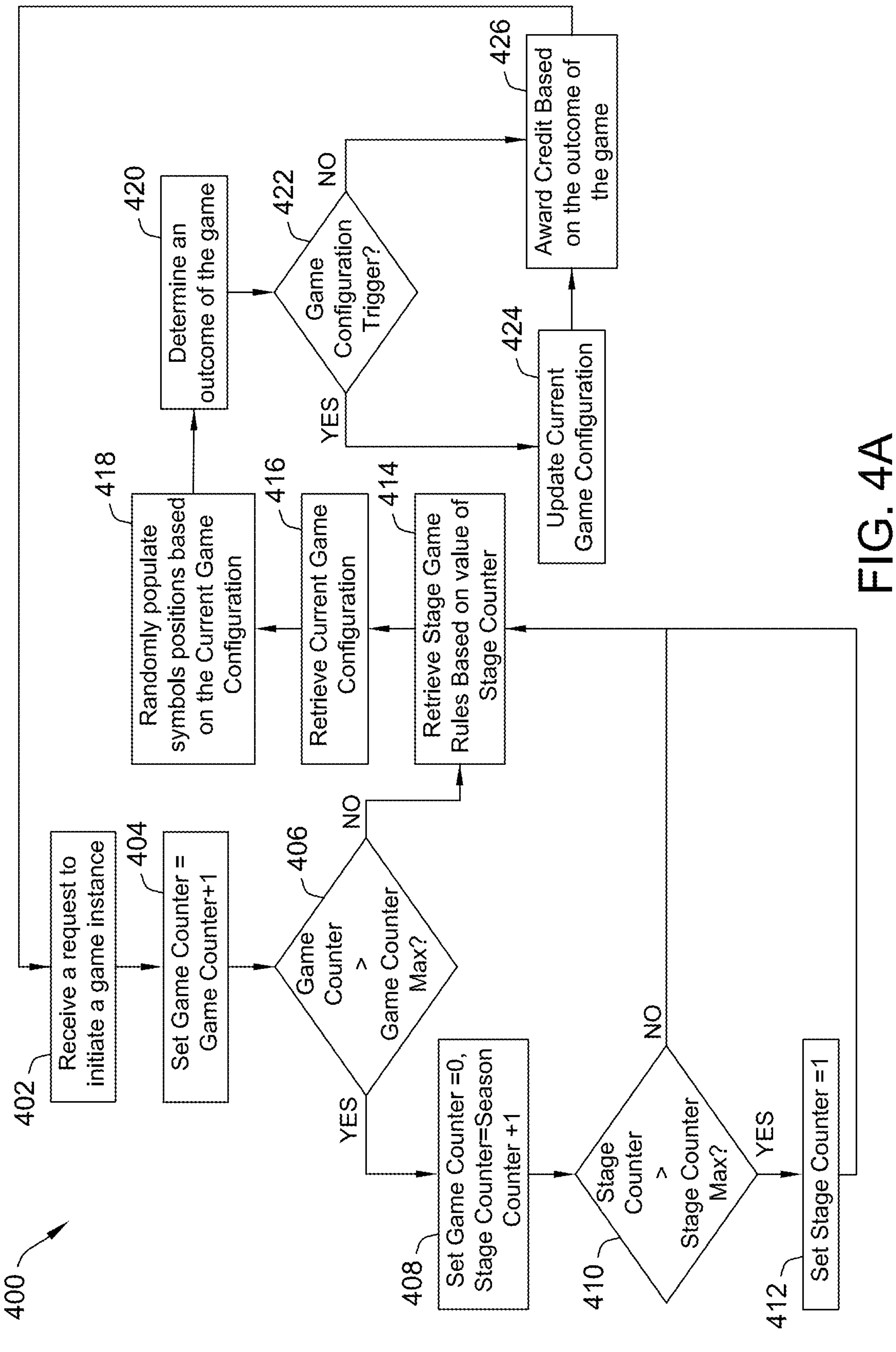
FIG. 4A is a flow chart of a process for executing electronic game play for display to a user on a gaming device, such as a gaming device similar to the gaming device of FIG. 1.
Figure 4B:
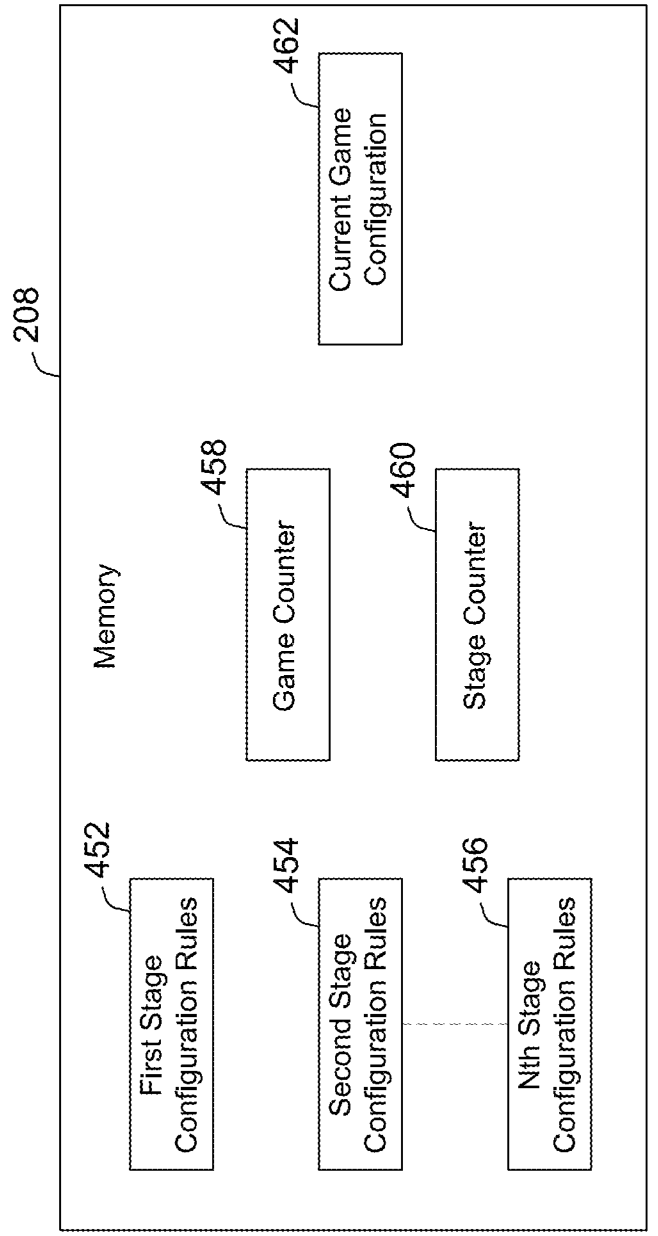
FIG. 4B is a schematic illustrating a memory storing data files used in the process of FIG. 4A

FIG. 4A is a flow chart of an exemplary process for executing electronic game play for display to a user. FIG. 4B is a schematic diagram showing the memory 208 of the gaming device.

In the example embodiment, the game is an electronic slot game in which a plurality of symbol positions are displayed to a user (e.g., in the matrix 502 shown in FIG. 5) and are randomly populated with a plurality of symbols (e.g., based on an RNG outcome). The processor 204 configures play of the game based on a set of instructions stored in the memory 208.

The game further utilizes persistence features to determine outcomes of the game and vary a gaming experience presented to the player. For example, as described with respect to FIGS. 5-13, in the example embodiment, the game play utilizes a cycle of different stages (alternatively "seasons") that are each associated with different game play rules. The rules associated with the stages each persist during game play instances of a respective stage until a stage trigger occurs (e.g., the game play counter exceeding a threshold), which causes the stage to increment. The outcomes during each of the games are determined based in part on the game configuration rules 452-456 (FIG. 4B) that are associated with respect to the corresponding stage. Additionally, the respective configuration rules 452-456 each include different persistence features, which may persist between games within a stage and between different stages. In the example embodiment, the configuration rules 452-456 for each of the seasons are each associated with an RTP that is substantially the same as the other seasons, such that no season has a payout advantage relative to the other seasons.

Referring to FIG. 4B, in the example embodiment the memory 208 stores a plurality of game stage configuration rules 452-456, a game counter 458, a stage counter 460, and a current game configuration 462. Each of the game configuration rules includes instructions for executing persistent features and game play associated with a respective games, which may be presented to the player sequentially, as described in greater detail below. The stage counter 460 tracks a current stage of the game, where each of the stage of the game is associated with one of the game configuration rules. The game counter tracks game instances of the game.

Figure 5:
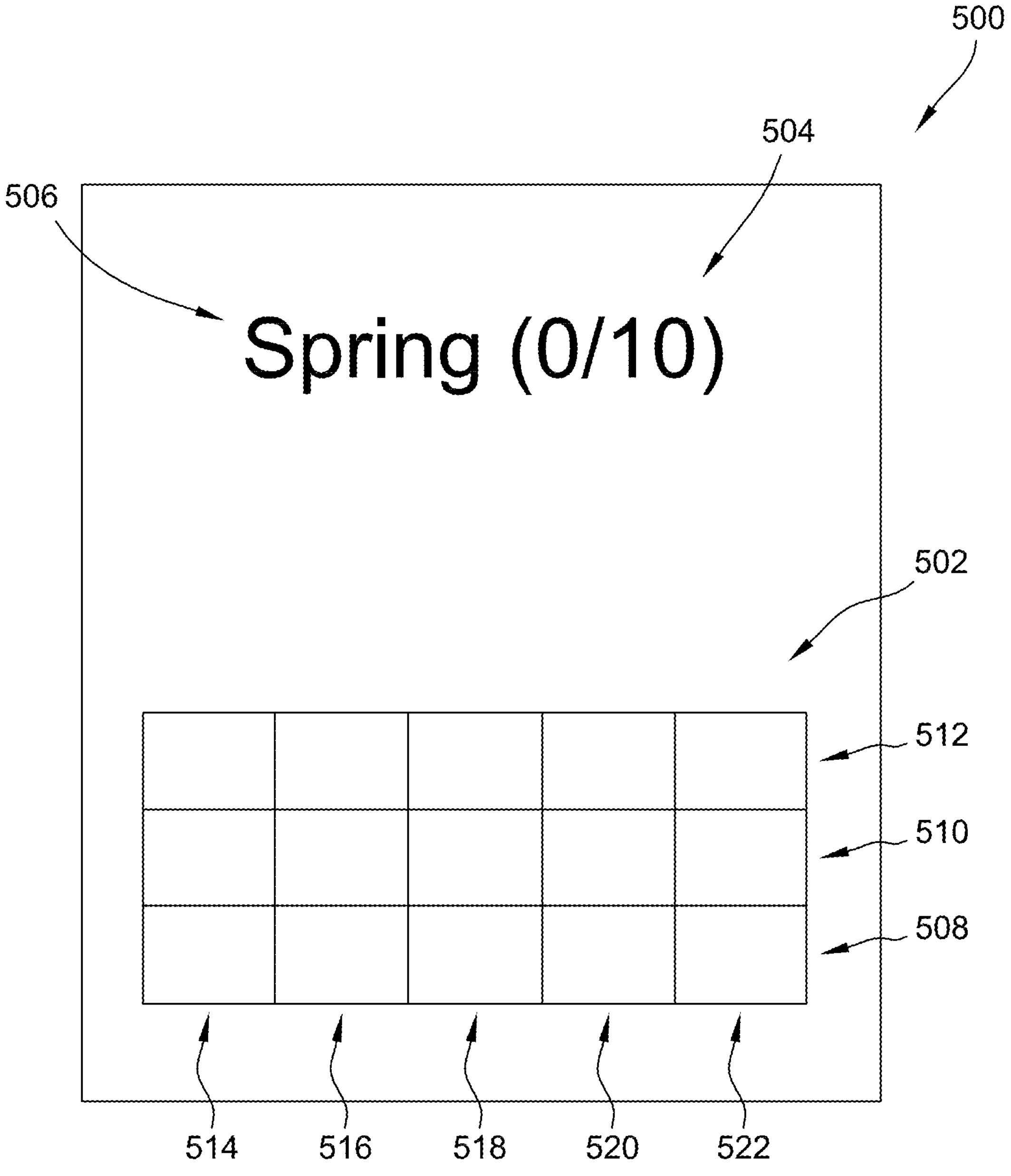
FIG. 5 is an example screen display showing display of a first stage of a game according to the process of FIG. 4, prior to initiating a first game instance.

FIG. 5 is a schematic of an example game display, which in the example embodiment, is displayed by mobile gaming devices 256, though in alternative embodiment the game may be displayed on a gaming device similar to gaming devices 104A-104X, shown in FIG. 1.

Game display 500 includes a base matrix 502 for displaying a plurality of symbols therein. Game display 500 further includes a stage indicator 506 displaying a current stage of the game and a game counter 504 displaying a current game count within the stage. In the example embodiment, each stage is configured to last for 10 games before proceeding to a next stage. After four stages have been played, the game cycles back to the initial stage. In other embodiments, the game many include any suitable number of stages or games within a stage.

Referring back to FIG. 4, at a first step 402 in the process 400, a request is received to initiate a game instance. In the example embodiment, upon receiving the request, the processor retrieves a current game count and a current stage count from the memory 208. In some embodiments the current game counter and stage counter are each associated with a player tracking account associated with the player. For example, in mobile or internet gaming embodiments, prior to initiating game play, the player may be prompted to login to their account, which may be associated with a current game and stage counts from a last played session by the player. In casino gaming embodiments, a player tracking card, e.g., associated with a casino player tracking account, or other suitable method of tracking a player identity may be used. In further embodiments, the game counter and stage counter may be associated with game play on an individual gaming device of the EGM.

In the example embodiment, for a first play instance logged by player (i.e., the first time the player plays the game after first downloading a mobile application or first login to their online account) the stage and game counter are each set to zero. As a result, the first game play will start in the spring season stage with the game counter 458 at zero. After the request to initiate a game instance (i.e., a single spin of the game), the game counter 458 is set to game counter equal to 1. At step 406, processor 204 determines whether the game counter 458 exceeds a game counter threshold or maximum. In the example of FIG. 5, the game counter 458 is less than the threshold of 10. As a result, process proceeds to step 414.

At step 414, the processor 204 retrieves current game rules based on a value of the stage counter 460 (FIG. 4B), which is equal to 1 in the example of FIG. 5. In the example embodiment, the rules for the "spring season" are retrieved based on the stage counter value of 1. At step 416, processor 204 retrieves a current game configuration, which is an empty 3×5 matrix that includes three rows 508-512 and five columns 514-522, as shown in FIG. 5. At step 418 processor 204 randomly populates symbol positions of the 3×5 matrix based on the current configuration and an outcome of the game is determined at step 420.

Figure 9:
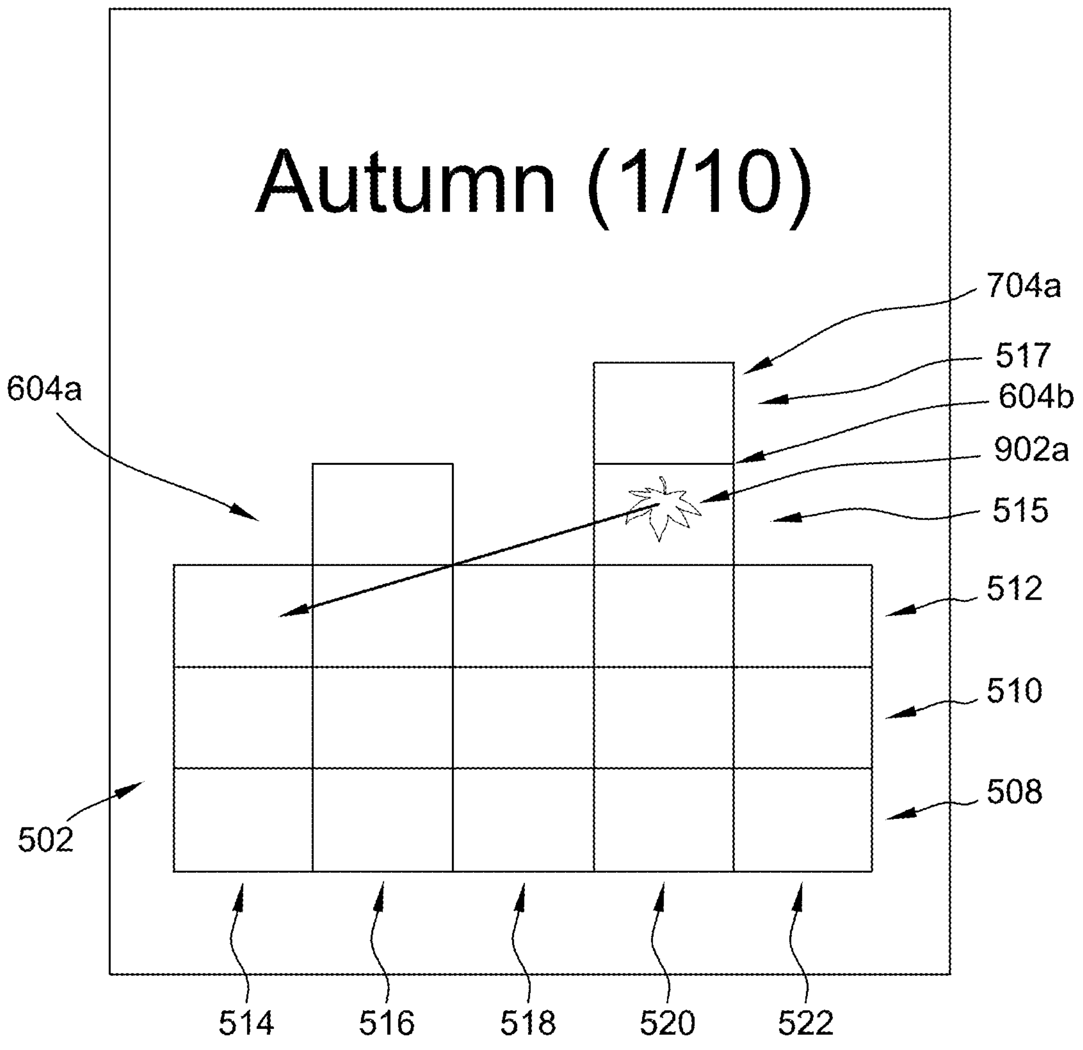
FIG. 9 is an example screen display showing display of a first game instance of a third stage of the game shown in FIG. 5.
Figure 10:
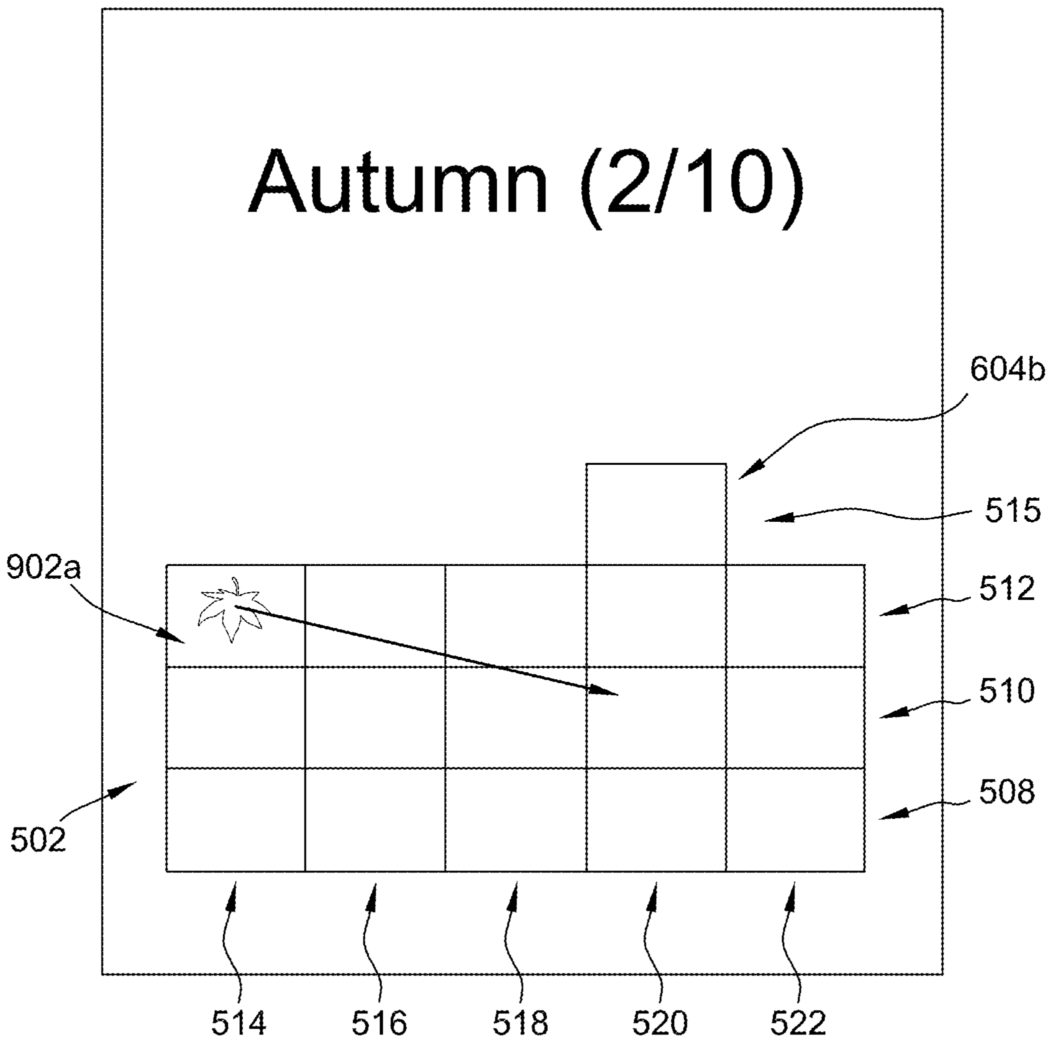
FIG. 10 is an example screen display showing display of a second game instance of the third stage of the game shown in FIG. 5.
Figure 12:
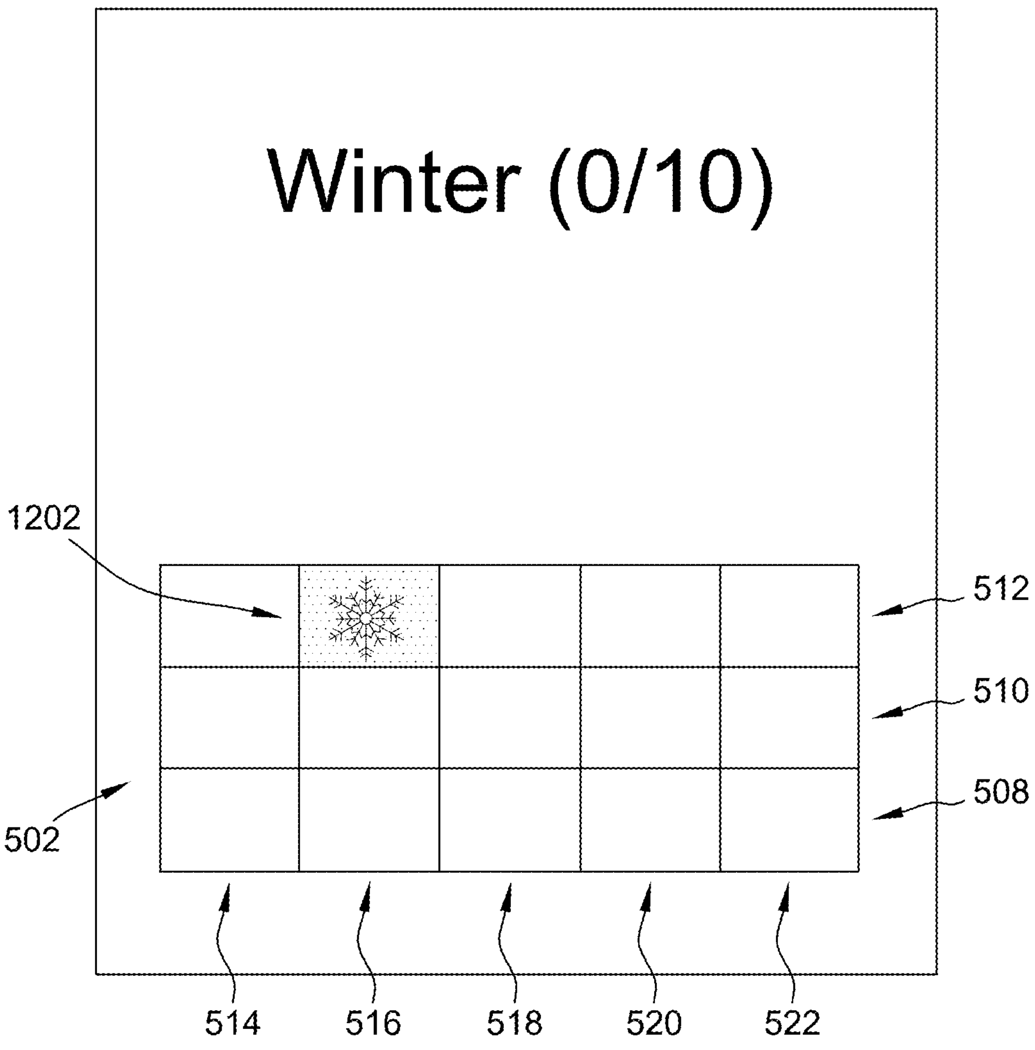
FIG. 12 is an example screen display showing display of a fourth game instance of the fourth stage of the game shown in FIG. 5.

At step 422, processor 204 determines whether the outcome of the game satisfies a game configuration trigger. The game configuration trigger may be in part based on the stage rules for the current stage and/or may be based on one or more symbols in the outcome of the game that trigger a persistence feature. For example, such persistent features may include causing one or more of the symbols to be displayed on one of the symbol positions during a next game instance (e.g., a "sticky WILD," as shown in FIG. 12, or a descending WILD, as shown in FIGS. 9 and 10), altering a game layout of the game (e.g., by changing a number of symbol positions in at least one of the columns), or making any other suitable change to the game that persists into a next game instance.

In the embodiment of FIGS. 5-16, some of the different seasons (i.e., stage of the cycle) are associated with unique persistence features and unique stage symbols that activate a respective persistence feature and/or alter the total credit outcome of the game (e.g., by acting as a wild symbol, a multiplier, etc.). For example, referring to FIG. 6, under the stage game rules for the spring season the SEED symbol 602*a*, 602*b* is a trigger symbol that activates a spring persistence feature. As illustrated in FIGS. 6-12, only the trigger symbols for the respective seasons are shown, although it should be understood that the game outcomes will include other symbols displayed in the blank symbol positions of the reels.

Figure 6:
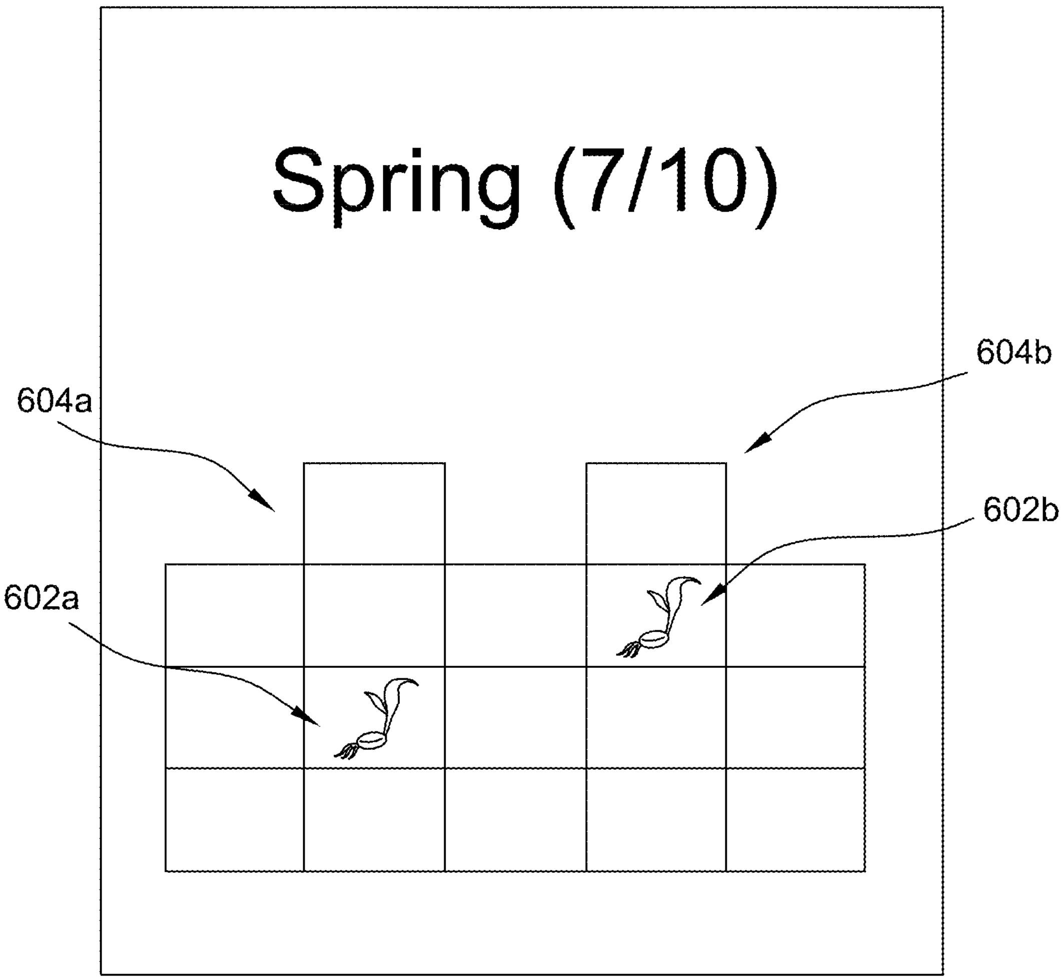
FIG. 6 is an example screen display showing display of a seventh game instance of the first stage of the game shown in FIG. 5.
Figure 7:
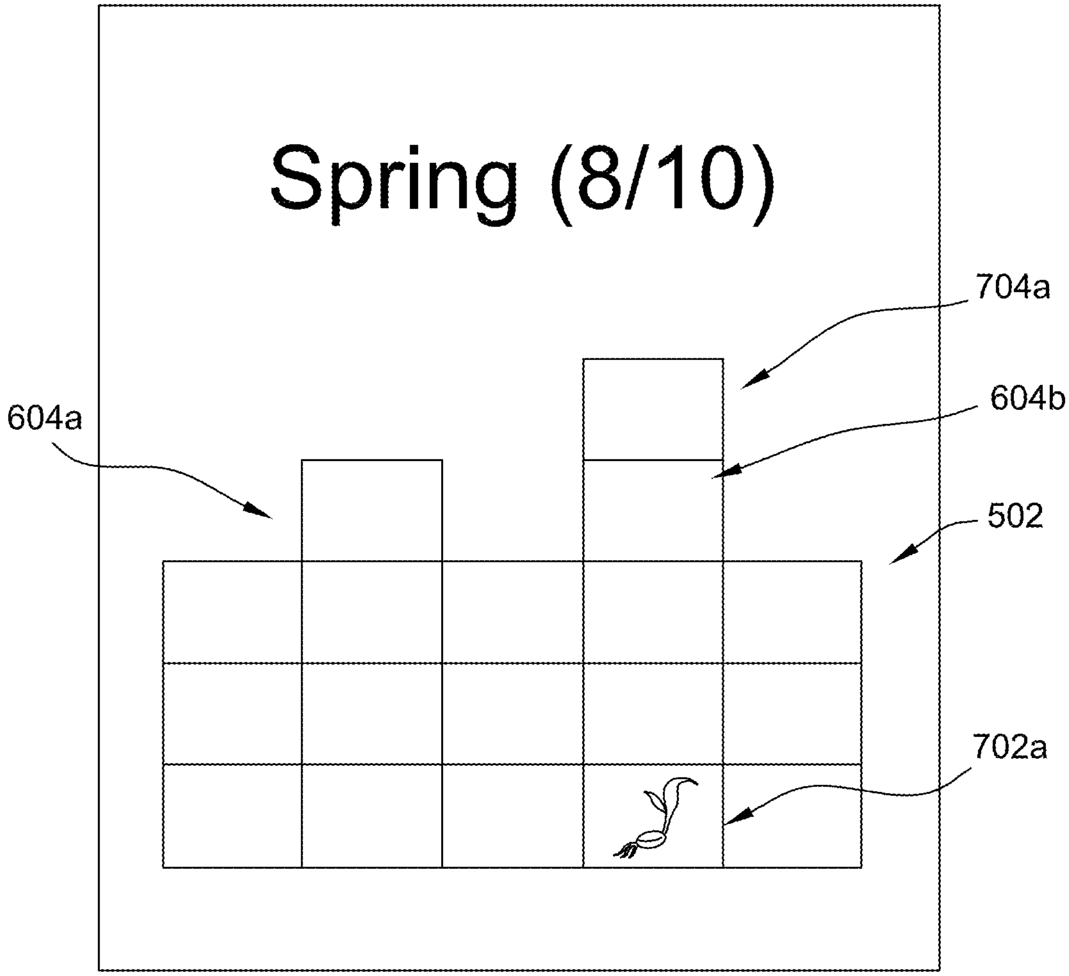
FIG. 7 is an example screen display showing display of an eighth game instance of the first stage of the game shown in FIG. 5.
Figure 8:
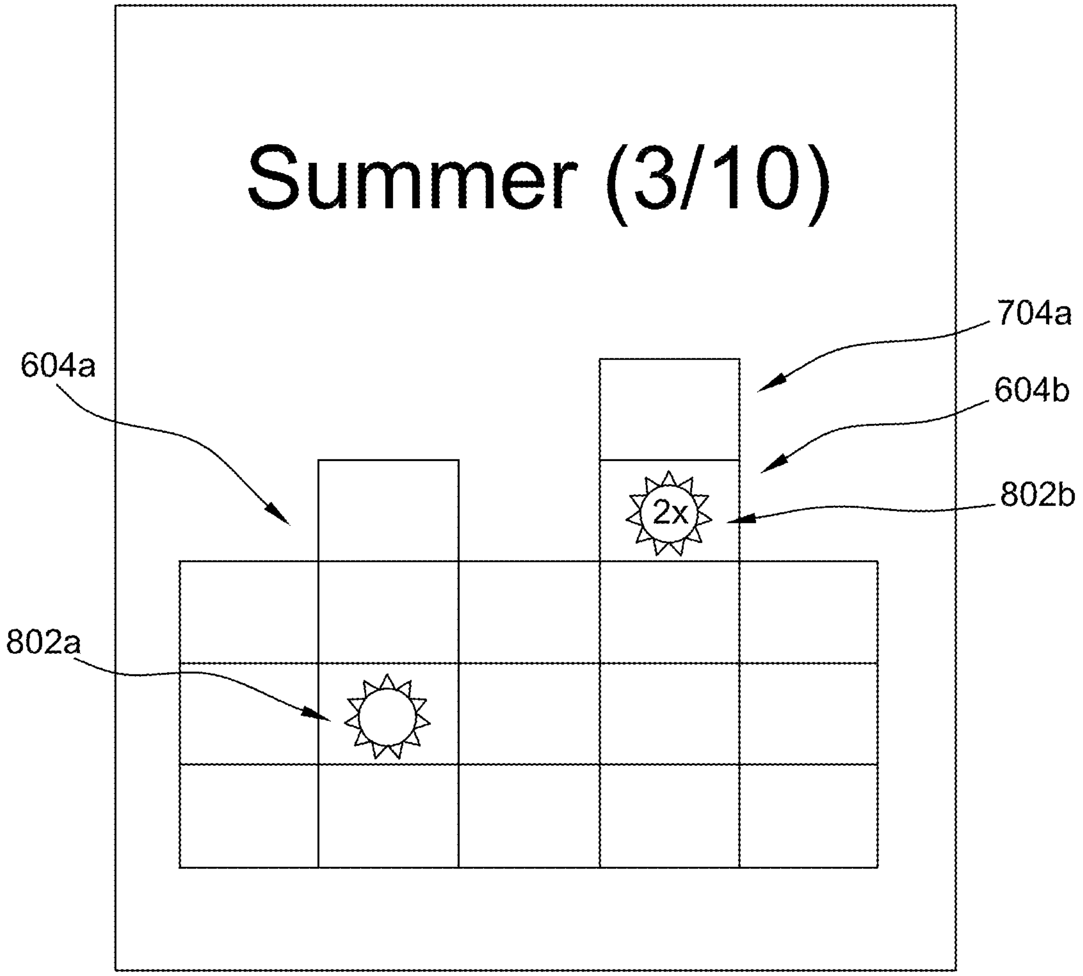
FIG. 8 is an example screen display showing display of a third game instance of a second stage of the game shown in FIG. 5.

As shown in FIG. 6, the outcome includes two seed symbols 602*a*, 602*b* occurring in the second and fifth columns, respectively. The occurrence of the SEED symbols 602*a*, 602*b* during the spring season is evaluated as a WILD symbol, increasing the number of possible pay lines for a given game instance. Additionally, the occurrence of the SEED symbol 602*a*, 602*b* in the selected plurality of symbols during the Spring Season also affects a layout of the matrix by adding an additional row to the column (i.e., increasing column height) in which the seed symbol 602*a*, 602*b* occurs. In the example embodiment, new symbol positions 604*a*, 604*b* are added to the second and fourth columns, respectively.

Accordingly, with respect to the game outcome shown in FIG. 6, after the outcome is determined at step 420, processor 204 determines that a game configuration trigger has occurred. The determination is based on the first stage game rules 452 (i.e., the spring season rules) and the outcome of the base game. In response, at step 424 (FIG. 4) processor 204 updates the current game configuration to include the added symbol positions 604*a*, 604*b* above the second and fourth columns.

In the example embodiment, the increased column height feature of the spring season persists through each game of the spring season. For example, referring to FIG. 7 which shows an outcome for an eighth game instance of the spring season play, the added symbol positions 604*a*, 604*b* are included in the matrix 502. Additionally, a new SEED symbol has occurred in the outcome in the fourth column, thereby causing the fourth column to grow by one symbol position 704*a*.

In some embodiments, the persistence features may also persist between seasons. For example, referring to FIG. 8 which shows an outcome for a third game instance of the summer season play, the symbol positions 604*a*, 604*b*, 704*a* added during the spring play are shown as persisting into the summer season play, and even persist into the fall (autumn) season play (FIG. 9).

In the example embodiment, the seasons or stages of game play increment after play of ten game instances has occurred. For example, referring to FIG. 4, after a tenth play instance of the spring game, at step 404 processor 204 sets the game counter to eleven (i.e., equal to the current game counter having a value of ten plus one). At step 406, the game counter having a value of eleven is determined to be greater than the threshold game counter having a value of ten. Accordingly, at step 408, processor sets the stage counter equal to two (i.e., equal to the current stage counter having a value of one plus one). At step 410, processor determines that the current stage counter value of two is not greater than the stage counter threshold, which has a value of four in the example embodiment, corresponding to the four seasons of game play. Accordingly, at step 414, processor retrieves the stage game rules for the second stage of game play and at step 416 retrieves the current game configuration, including the persistent symbols from the spring game play.

In the example embodiment, the trigger symbols for the respective seasons are provided on static reels (i.e., the symbols on the reels do not change between game instances and/or seasons) and may occur in the outcomes during any one of the seasons. Thus, the SEED trigger symbol used during spring may still occur in an outcome during play of the summer season. In such embodiments, the out-of-season symbol may be evaluated under a payline, similar to a standard picture symbol, and without triggering any persistence feature when they occur in game outcomes out of season. In other embodiments, different reels may be used between seasons which do not include the out-of-season symbols thereon.

Referring back to FIG. 8, in the example embodiment, SUN symbols 802*a*, 802*b* are used for the trigger symbol for the summer season. During the summer play, the SUN symbol evaluates as a multiplier wild and is updated to display a multiplier value. The multiplier value is selected based on a randomized lookup of a lookup table. In the example embodiment, a ways wins evaluation is used to determine credit awards associated with the outcome. The ways wins credit awards are calculated by multiplying a payout of the determined evaluation by the multiplier provided on the trigger symbol. As an example, if a ways win pay line of the game evaluates to 100 credits, the occurrence of the 2× multiplier symbol in the payline doubles the payout to 200 credits. In the example embodiment the SUN symbol does not trigger a persistence feature and thus the game configuration is not updated during summer play.

FIGS. 9 and 10 show outcomes of first and second game play instances, respectively, during the fall season. In the example embodiment, LEAF symbol 902*a* is used for the trigger symbol during play of the fall season. During the fall play, the LEAF symbols evaluate to a wild symbol that also persist between game instances as falling one row per game instance, until the LEAF symbol reaches the lowest row 508. For example, as shown in FIG. 9, LEAF symbol 902*a* is shown occurring in the fourth row 515 of the fourth column 520. At step 422 (shown in FIG. 4) processor determines that a game configuration trigger has occurred and at step 424 updates the current game configuration to move the leaf symbol 902*a* down one row to row 512 and into the first column 514 for the next game instance, as shown in FIG. 10. The new column that the LEAF symbol 902*a* is moved to may be a random determination or may be preconfigured. In some embodiments, process 400 includes a check to prevent two falling LEAF symbols occurring in the same row landing in the same symbol position for the next game instance. In other embodiments, the LEAF symbols may be allowed to land in the same symbol position and a multiplier value may be assigned to them if this occurs.

Additionally, in the example embodiment, the added symbol positions 604*a*, 604*b*, 704*a* persisting from the spring play are incrementally removed during the fall play. For example, as shown in FIG. 10, in the second game instance symbol positions 704*a*, 604*a* (shown in FIG. 9) are removed, while symbol position 604*b* is maintained. As a result, when the game proceeds to the winter stage, as shown in FIG. 11, the matrix 502 is returned to the originally starting 3×5 matrix used during the start of the spring season.

The loss of the added positions over the fall season may be distributed over the fall season according to a predetermined pattern. For example, in some embodiments the symbol positions 604*a*, 604*b*, 704*a* are removed in an inverse order from the game instances in which they were added. In other embodiments, the removal of symbols 604*a*, 604*b*, 704*a* may be evenly distributed, such as by removing one of the symbols 604*a*, 604*b*, 704*a* once every three instances, corresponding to the three added symbols over the season period of ten game instances. In other embodiments, the added symbols 604*a*, 604*b*, 704*a* are removed all at once, such as after a last game instance of the season.

In some embodiments, a determination is made prior to each spin whether one of the symbol positions 604*a*, 604*b*, 704*a* will be removed. The determination may be made based on an RNG output and a lookup of a weighted table identifying added symbol positions to be removed. The weighted table may also identify the game instance to weight the removal of symbol positions based on progression through the fall stage. For example, where three symbol positions have been added, the weighted table may increase the probability that the symbol positions will be removed earlier in the fall stage to increase a probability that all symbol positions are removed by the end of the fall stage (i.e., after ten game instances). Upon initiation of a spin and the occurrence of the LEAF symbol 902*a* it is determined based on the determination of whether one of the symbols 604*a*, 604*b*, 704*a* will be removed to assign the LEAF symbol 902*a* to a position that is not removed.

Figure 11:
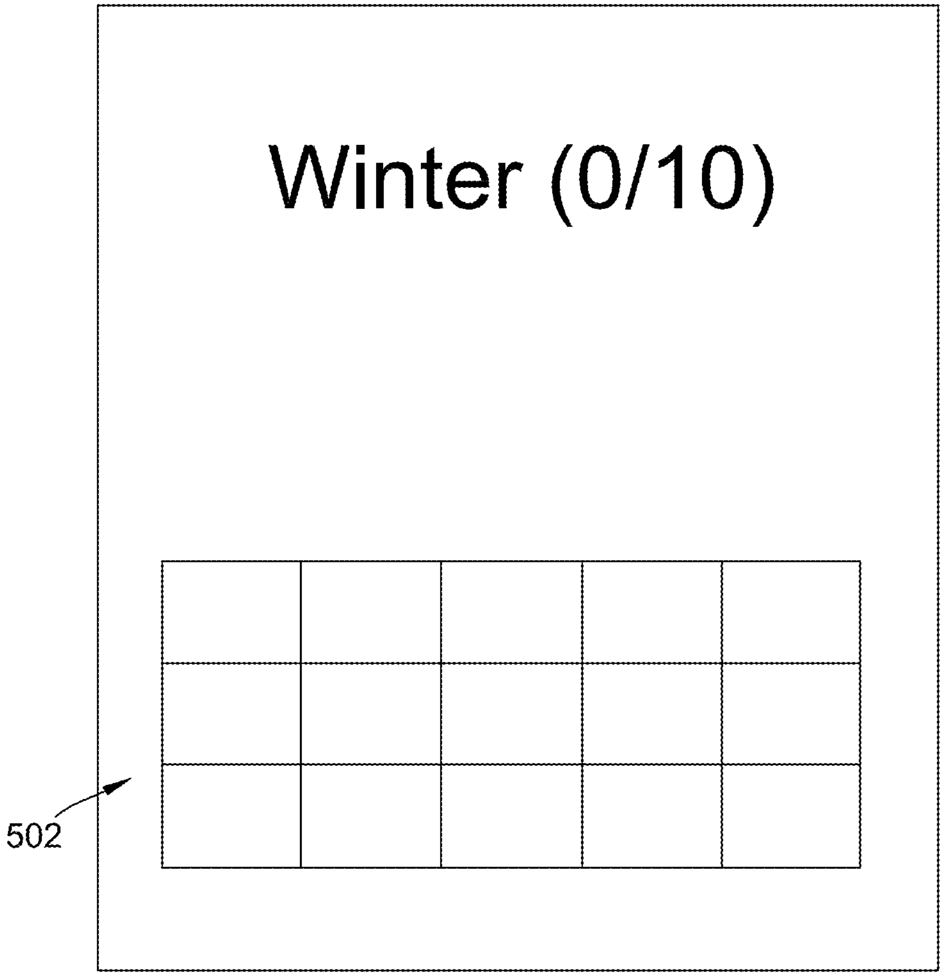
FIG. 11 is an example screen display showing display of a fourth stage of the game shown in FIG. 5, prior to initiating a first game instance of the fourth stage.

FIG. 11 shows a starting instance (i.e., prior to a first game instance) of gameplay during the winter season (or fourth stage). FIG. 12 shows a fourth game instance of gameplay during the winter season.

Referring to FIG. 12, in the example embodiment, SNOW symbol 1202 is used for the trigger symbol during play of the fall season. During the winter play, the SNOW symbols evaluate to a wild symbol that also persist in a fixed symbol position between game instances (also referred to as a "sticky wild"). When the SNOW symbol occurs in an outcome, it is shown on the display as freezing to the symbol position and locking it as a wild until the end of season. In other words, in the example embodiment SNOW symbol 1202 will persist in position in the third row 512 of the second column 516 for game instances five through ten of the winter season.

Referring back to FIG. 4, after the tenth game instance of the winter season at step 410, processor determines that the stage counter having a value of five is greater than the stage counter threshold, which has a value of four in the example embodiment. As a result, the stage counter is reset to the one, causing the game to reset to the spring game play, as shown in FIG. 5. In some embodiments, after a full year is completed a bonus prize, free spins feature, or another type of award may be provided to the player.

In other embodiments, the changes between stages may occur based on an alternative triggers apart from the game counter as described in the example embodiment. For example, in some embodiments, the stage changes may be triggered based on outcomes in the game (e.g., growing the reels a predetermined number of times, receiving a predetermined number of the trigger symbols). In other embodiments, the changing of the seasons may occur randomly based on a determination made after each spin. In further embodiments, the stage change may correspond to an event occurrence that is independent from gameplay, such as a time of the year. As an example, in some embodiments, the game may provide only the spring stage for play during the months of spring.

Figure 13:
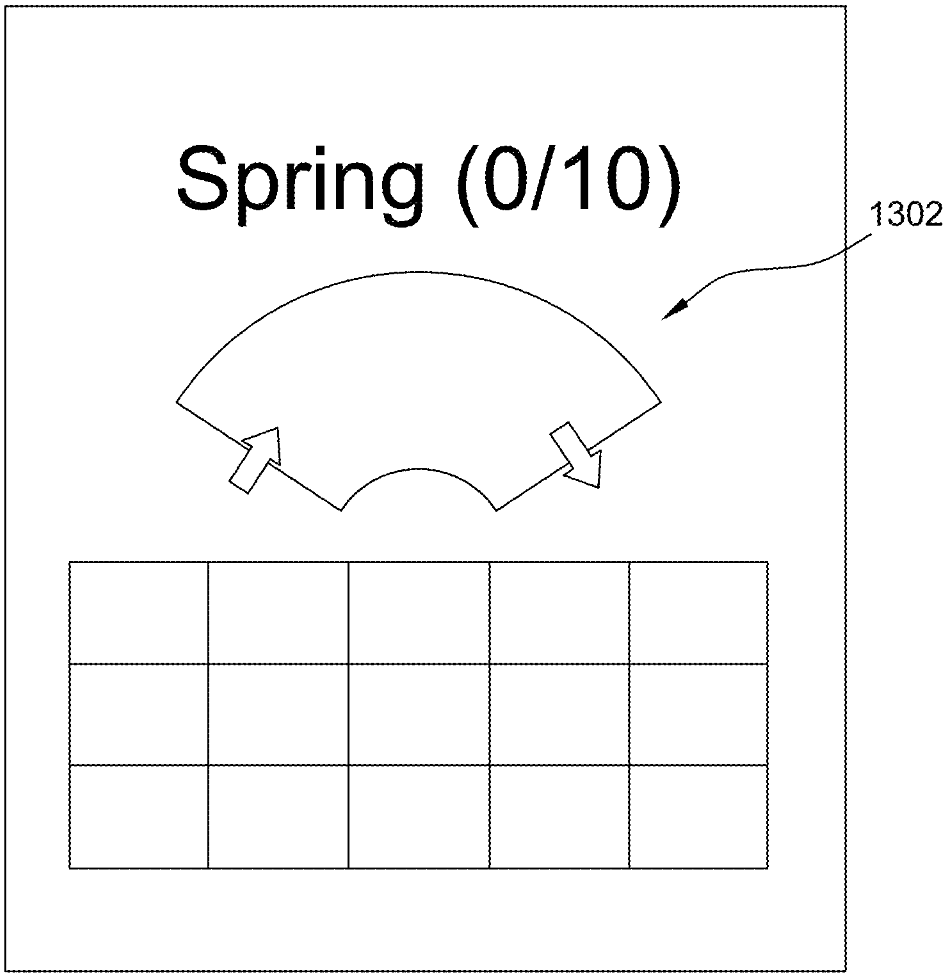
FIG. 13 is an alternative screen display showing display of a first stage of a game according to the process of FIG. 4, prior to initiating a first game instance.

Referring to FIG. 13, in some embodiments, each season may also have its own mini game, such as a small feature or free spins game that can be triggered and played outside of the base games in a second display area 1302. As an example, in one embodiment, the fall season may include a horse race provided within the area 1302 that runs throughout the gameplay over the season. The feature game may be displayed above the reels in the area 1302 during play of the season.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming system comprising:

a processor; and a memory storing instructions thereon and a plurality of stage game rule sets, each rule set of the stage game rule sets corresponding with a stage of a game, wherein the instructions when executed by the processor, cause the processor to:

cause display of a plurality of columns each including a plurality of symbol positions based on a first game configuration stored in the memory for a first game instance of a first stage of the game;

cause display of a first game outcome for the first game instance based on the first game configuration the first game outcome being evaluated according to a first rule set associated with the first stage;

change the first game configuration to a second game configuration based on a first trigger symbol occurring in the first game outcome, the first rule set identifying the first trigger symbol and the change to be made to the first game configuration; and cause display of a second game outcome for a first game instance of a second stage of the game based on the second game configuration, the second game outcome being evaluated according to a second rule set associated with the second stage.

2. The gaming system of claim 1, wherein the first game configuration includes a number of symbol positions for each column of the plurality of columns and wherein changing the first game configuration includes changing the number of symbol positions for at least one of the columns.

3. The gaming system of claim 1, wherein the first game configuration identifies whether a persistent WILD symbol is pre-populated for any of the symbol positions, and wherein updating the first game configuration includes assigning a persistent WILD symbol to a first symbol position of the plurality of symbol positions.

4. The gaming system of claim 1, wherein the instructions when executed by the processor, cause the processor to change the second game configuration to a third game configuration based on a second trigger symbol occurring in the second game outcome, the second rule set identifying the second trigger symbol and the change to be made to the second configuration.

5. The gaming system of claim 4, wherein the first rule set identifies that the change to be made to the first game configuration is to change a number of symbol positions in a first column in which the first trigger symbol occurs, and wherein the second rule set identifies that the change to be made to the second game configuration is to assign the second trigger symbol as a persistent symbol to occur in an outcome of a second game instance of the second stage.

6. The gaming system of claim 1, wherein each stage game rule set of the plurality of stage game rule sets identifies at least one trigger symbol and a change to be made to the game configuration based on the at least one trigger symbol occurring in the game outcome.

7. The gaming system of claim 1, wherein the memory stores a game play counter and a stage counter, and wherein the instructions when executed by the processor, cause the processor to:

update the game play counter for the second game instance of the first stage of the game;

determine that the game play counter is greater than a threshold number of game play instances; and update the stage counter from the first stage to the second stage based on the determination.

8. The gaming system of claim 7, wherein the instructions when executed by the processor, cause the processor to:

determine whether the game stage counter exceeds a threshold; and reset the stage counter to the first stage in response to the determination.

9. The gaming system of claim 1, wherein the plurality of stage game rule sets include four game rule sets each identifying a different change to be made to the game configuration and a trigger symbol for activating the change, each game rule set associated with a season of the year such that the first game rule set is associated with a spring season, the second game rule set is associated with a summer season, a third game rule set is associated with a fall season, and a fourth game rule set is associated with a winter season.

10. The gaming system of claim 9, wherein the first game configuration includes a number of symbol positions for each column of the plurality of columns and wherein changing the first game configuration to the second configuration includes adding at least one symbol position to a first column in which the trigger symbol occurs, wherein the second configuration includes the at least one symbol position for each game instance of the second stage of the game.

11. The gaming system of claim 10, wherein the at least one symbol position is removed during a third stage of the game such that, at a first game instance of a fourth stage of the game, the number of symbol positions is equal to the number of symbol positions of the first instance of the first stage.

12. A non-transitory computer-readable media containing instructions embodied thereon which, when executed by a processor, cause the processor to:

store a plurality of stage game rule sets, each rule set of the stage game rule sets corresponding with a stage of a game;

cause display of a plurality of columns each including a plurality of symbol positions based on a first game configuration for a first game instance of a first stage of the game;

cause display of a first game outcome for the first game instance based on the first game configuration, the first game outcome being evaluated according to a first rule set associated with the first stage;

change the first game configuration to a second game configuration based on a first trigger symbol occurring in the first game outcome, the first rule set identifying the first trigger symbol and the change to be made to the first game configuration; and cause display of a second game outcome for a first game instance of a second stage of the game based on the second game configuration, the second game outcome being evaluated according to a second rule set associated with the second stage.

13. The non-transitory computer-readable media of claim 12, wherein the first game configuration includes a number of symbol positions for each column of the plurality of columns and wherein changing the first game configuration includes changing the number of symbol positions for at least one of the columns.

14. The non-transitory computer-readable media of claim 12, wherein the first game configuration identifies whether a persistent WILD symbol is pre-populated for any of the symbol positions, and wherein updating the first game configuration includes assigning a persistent WILD symbol to a first symbol position of the plurality of symbol positions.

15. The non-transitory computer-readable media of claim 12, wherein the instructions when executed by the processor, cause the processor to change the second game configuration to a third game configuration based on a second trigger symbol occurring in the second game outcome, the second rule set identifying the second trigger symbol and the change to be made to the second configuration.

16. The non-transitory computer-readable media of claim 15, wherein the first rule set identifies that the change to be made to the first game configuration is to change a number of symbol positions in a first column in which the first trigger symbol occurs, and wherein the second rule set identifies that the change to be made to the second game configuration is to assign the second trigger symbol as a persistent symbol to occur in an outcome of a second game instance of the second stage.

17. The non-transitory computer-readable media of claim 12, wherein each stage game rule set of the plurality of stage game rule sets identifies at least one trigger symbol and a change to be made to the game configuration based on the at least one trigger symbol occurring in the game outcome.

18. The non-transitory computer-readable media of claim 12, wherein the instructions when executed by the processor, cause the processor to:

store a game play counter and a stage counter;

increment the game play counter for the second game instance of the first stage of the game;

determine that the game play counter is greater than a threshold number of game play instances; and update the stage counter from the first stage to the second stage based on the determination.

19. A method of implementing a game comprising:

storing, on at least one memory, a plurality of stage game rule sets on a memory, each rule set of the stage game rule sets corresponding with a stage of the game;

causing display of a plurality of columns each including a plurality of symbol positions based on a first game configuration for a first game instance of a first stage of the game;

causing display of a first game outcome for the first game instance based on the first game configuration, the first game outcome being evaluated according to a first rule set associated with the first stage;

changing the first game configuration to a second game configuration based on a first trigger symbol occurring in the first game outcome, the first rule set identifying the first trigger symbol and the change to be made to the first game configuration; and causing display of a second game outcome for a first game instance of a second stage of the game based on the second game configuration, the second game outcome being evaluated according to a second rule set associated with the second stage.

20. The method of claim 19 further comprising changing the second game configuration to a third game configuration based on a second trigger symbol occurring in the second game outcome, the second rule set identifying the second trigger symbol and the change to be made to the second configuration.

* * * * *